US009479888B2

(12) United States Patent
Wu et al.

(10) Patent No.: US 9,479,888 B2
(45) Date of Patent: Oct. 25, 2016

(54) METHODS AND APPARATUS FOR IMPLEMENTING SOUND EVENTS

(71) Applicant: TENCENT TECHNOLOGY (SHENZHEN) COMPANY LIMITED, Shenzhen (CN)

(72) Inventors: Xiayu Wu, Shenzhen (CN); Jianye Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 71 days.

(21) Appl. No.: 14/621,560

(22) Filed: Feb. 13, 2015

(65) Prior Publication Data
US 2015/0163612 A1    Jun. 11, 2015

Related U.S. Application Data

(63) Continuation of application No. PCT/CN2014/082669, filed on Jul. 22, 2014.

(30) Foreign Application Priority Data

Aug. 8, 2013 (CN) .......................... 2013 1 0344325

(51) Int. Cl.
H04R 5/00 (2006.01)
H04S 7/00 (2006.01)
H04S 1/00 (2006.01)
H04R 5/04 (2006.01)
H04S 3/00 (2006.01)
G06F 3/16 (2006.01)
A63F 13/54 (2014.01)

(52) U.S. Cl.
CPC ................ H04S 7/00 (2013.01); G06F 3/165 (2013.01); H04R 5/04 (2013.01); H04S 1/002 (2013.01); H04S 3/00 (2013.01); *A63F 13/54* (2014.09)

(58) Field of Classification Search
None
See application file for complete search history.

(56) References Cited

U.S. PATENT DOCUMENTS

| 5,633,993 A * | 5/1997 | Redmann ............... G06F 3/011 345/419 |
| 6,125,398 A * | 9/2000 | Mirashrafi ........... H04L 12/1822 370/263 |
| 9,100,272 B1 * | 8/2015 | Sullivan ............. H04L 29/0653 |
| 2007/0227342 A1 * | 10/2007 | Ide ........................ G10H 1/0058 84/645 |

FOREIGN PATENT DOCUMENTS

| CN | 101355766 A | 1/2009 |
| CN | 102117221 A | 7/2011 |
| CN | 102572060 A | 7/2012 |
| CN | 102930889 A | 2/2013 |
| CN | 103079145 A | 5/2013 |
| WO | 2005039160 A1 | 4/2005 |

OTHER PUBLICATIONS

The World Intellectual Property Organization (WIPO) International Search Report for PCT/CN2014/082669 Oct. 27, 2014.

* cited by examiner

Primary Examiner — Muhammad N Edun
(74) Attorney, Agent, or Firm — Anova Law Group, PLLC

(57) ABSTRACT

Methods and apparatus for implementing sound events are provided. When a first sound event is triggered, a first virtual routing channel corresponding to the first sound event is determined. A link between the first virtual routing channel and a second virtual routing channel is established according to priority information of the first sound event. The second virtual routing channel is a virtual routing channel corresponding to a currently-implemented second sound event. One or more processes are performed including: using an electrical level of the first virtual routing channel to restrain an electrical level of the second virtual routing channel through the link, and using an electrical level of the second virtual routing channel to restrain an electrical level of the first virtual routing channel through the link. Accordingly, the apparatus includes a channel determining unit, a link establishing unit, and a restraining implementation unit.

20 Claims, 6 Drawing Sheets

METHODS AND APPARATUS FOR IMPLEMENTING SOUND EVENTS

CROSS-REFERENCES TO RELATED APPLICATIONS

This application is a continuation application of PCT Patent Application No. PCT/CN2014/082669 filed on Jul. 22, 2014, which claims priority to Chinese Patent Application No. 2013103443257, filed on Aug. 8, 2013, the entire contents of both of which are incorporated herein by reference.

FIELD OF THE DISCLOSURE

The present disclosure generally relates to the field of information-processing technology and, more particularly, relates to methods and the apparatus for implementing sound events.

BACKGROUND

Currently, when multiple sound events are triggered in a same application program, a ducking effect is often desired. That is, when one audio track appears, other currently-running sound tracks may be lowered down. The application program may lower the sound volume of the sound event that has a lower priority than other sound event. After a pre-set fixed time, the sound volume of the sound event which has previously been lowered down may be restored.

When a sound event is triggered, it is difficult to determine the playing length and sample status corresponding to the sound event, which provides low control-accuracy of the ducking effect between multiple sound events.

BRIEF SUMMARY OF THE DISCLOSURE

One aspect or embodiment of the present disclosure includes a method for implementing sound events. When a first sound event is triggered, a first virtual routing channel corresponding to the first sound event is determined. A link between the first virtual routing channel and a second virtual routing channel is established according to priority information of the first sound event. The second virtual routing channel is a virtual routing channel corresponding to a currently-implemented second sound event. One or more processes are performed including: using an electrical level of the first virtual routing channel to restrain an electrical level of the second virtual routing channel through the link, and using an electrical level of the second virtual routing channel to restrain an electrical level of the first virtual routing channel through the link.

Another aspect or embodiment of the present disclosure includes an apparatus for implementing sound events. The apparatus includes a channel determining unit, a link establishing unit, and a restraining implementation unit.

The channel determining unit is configured to determine a first virtual routing channel corresponding to a first sound event, when the first sound event is triggered. The link establishing unit is configured to establish a link between the first virtual routing channel determined by the channel determining unit and a second virtual routing channel, according to priority information of the first sound event. The second virtual routing channel is a virtual routing channel corresponding to a currently-implemented second sound event. The restraining implementation unit is configured to perform one or more processes including: using an electrical level of the first virtual routing channel to restrain an electrical level of the second virtual routing channel through the link, and using an electrical level of the second virtual routing channel to restrain an electrical level of the first virtual routing channel through the link.

Another aspect of the present disclosure includes a non-transitory computer-readable medium having computer program. When being executed by a processor, the computer program performs a method for implementing sound events. The method includes determining a first virtual routing channel corresponding to a first sound event when the first sound event is triggered, and establishing a link between the first virtual routing channel and a second virtual routing channel according to priority information of the first sound event. The second virtual routing channel is a virtual routing channel corresponding to a currently-implemented second sound event. The method also includes performing one or more processes including: using an electrical level of the first virtual routing channel to restrain an electrical level of the second virtual routing channel through the link, and using an electrical level of the second virtual routing channel to restrain an electrical level of the first virtual routing channel through the link.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to restrain the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

Methods for implementing sound events are provided. A ducking effect can be realized during an implementing process of multiple sound events. The disclosed methods can be implemented by apparatus for implementing sound events. In various embodiments, the terms "sound" and "sound event" can be interchangeably used. In various embodiments, the terms "volume" and "sound volume" can be interchangeably used.

Figure 1:
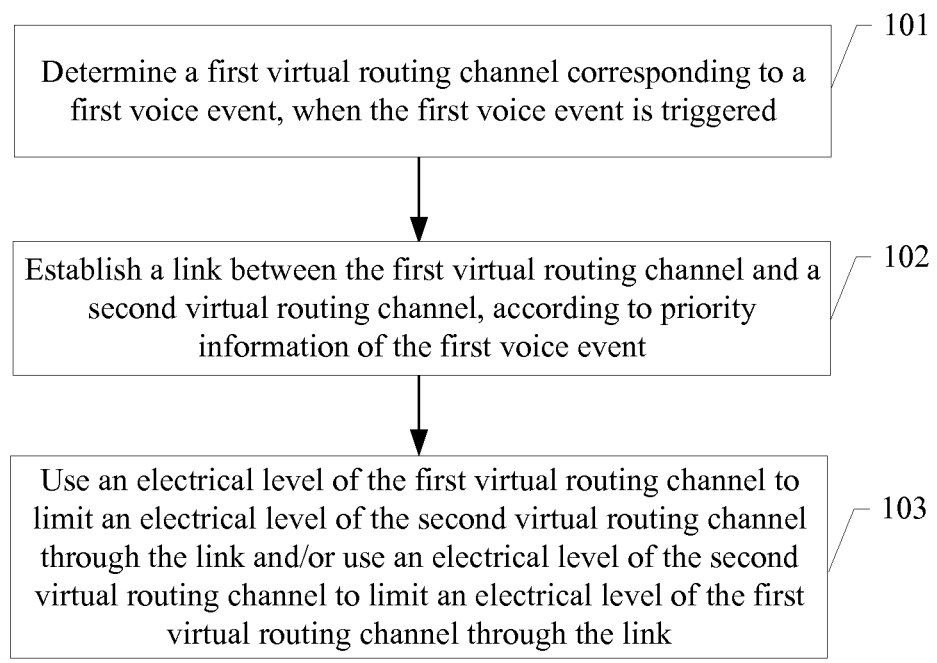
FIG. 1 depicts an exemplary method for implementing sound events consistent with various disclosed embodiments.

FIG. 1 depicts an exemplary method for implementing sound events consistent with various disclosed embodiments;

In Step S101, a first virtual routing channel corresponding to a first sound event is determined, when the first sound event is triggered.

Note that when the apparatus of implementing sound events runs a certain program, the user can trigger the implementation of any sound event (such as the first sound event) by operating the implementing apparatus of that sound event. When the implementing apparatus of sound events receives a triggering instruction of the first sound event, a first virtual routing channel corresponding to the first sound event can be determined.

Generally, the sound events with a same priority correspond to a same virtual routing channel. When the first sound event has a priority different than any currently-implemented sound event by the implementing apparatus of sound events, it is needed to establish a new first virtual routing channel for the first sound event. The disclosed method is a method with respect to establishing the first virtual routing channel. The priority of each of the above-mentioned sound events may be pre-set by the user in the implementing apparatus of sound events.

In Step S102, according to priority information of the first sound event, a link between the first virtual routing channel and a second virtual routing channel is established. The second virtual routing channel is a virtual routing channel corresponding to a currently-implemented second sound event.

In Step S103, an electrical level of the first virtual routing channel is used to restrain an electrical level of the second virtual routing channel and/or an electrical level of the second virtual routing channel is used to restrain an electrical level of the first virtual routing channel using the link established in Step S102.

As a virtual routing channel can be occupied when a certain sound event is being implemented, the electrical level of the virtual routing channel may indicate the sound volume intensity for the playing process when implementing a corresponding sound event. In one embodiment, when implementing Step S103 by the implementing apparatus of sound events, an level electrical of a certain virtual routing channel can be inputted into another virtual routing channel by the established link. In this another virtual routing channel, the inputted electrical level and the electrical level of this another virtual routing channel can be processed (or calculated) to output. In this manner, the volume of sound event corresponding to this another virtual routing channel and experienced by the user is the volume indicated by the electrical level outputted from this another virtual routing channel.

As such, the implementing apparatus of sound events establishes the link between different virtual routing channels, and through this link, uses an electrical level of the virtual routing channel to restrain another electrical level of the virtual routing channel. As the electrical level of a virtual routing channel may indicate the sound volume of a corresponding sound event, the sound volume of one sound event can be restrained in real time by the sound volume of another sound event, such that the sound volumes of the two sound events can be different. The disclosed method does not need to process the ducking effect to one sound event by obtaining dynamic information of another sound event. The disclosed method can improve control-accuracy of the ducking effect between multiple sound events.

In a specific embodiment, according to the relationship between the priority of the first sound event and the priority of the second sound event, the implementing apparatus of sound events can implements the exemplary Step S102 in FIG. 1 as follows.

In one embodiment when the second sound event includes one second sound event and when the first sound event has a priority higher than the one second sound event, Step S102 can be implemented by establishing the link for inputting from the first virtual routing channel to the second virtual routing channel. Step S103 can be implemented, through the link, by using the electrical level of the first virtual routing channel to restrain the electrical level of the second virtual routing channel. For example, when the first sound event is a human voice sound and the second sound event is a music sound, the volume of human sound is used to restrain the volume of music sound.

In another embodiment when the second sound event includes one second sound event and when the first sound event has a priority lower than the one second sound event, Step S102 can be implemented by establishing the link for inputting from the second virtual routing channel to the first virtual routing channel. Step S103 can be implemented, through the link, by using the electrical level of the second virtual routing channel to restrain the electrical level of the first virtual routing channel. For example, when the first sound event includes a bass sound and the second sound event includes a guitar sound, the volume of guitar sound is used to restrain the volume of bass sound.

Figure 2:
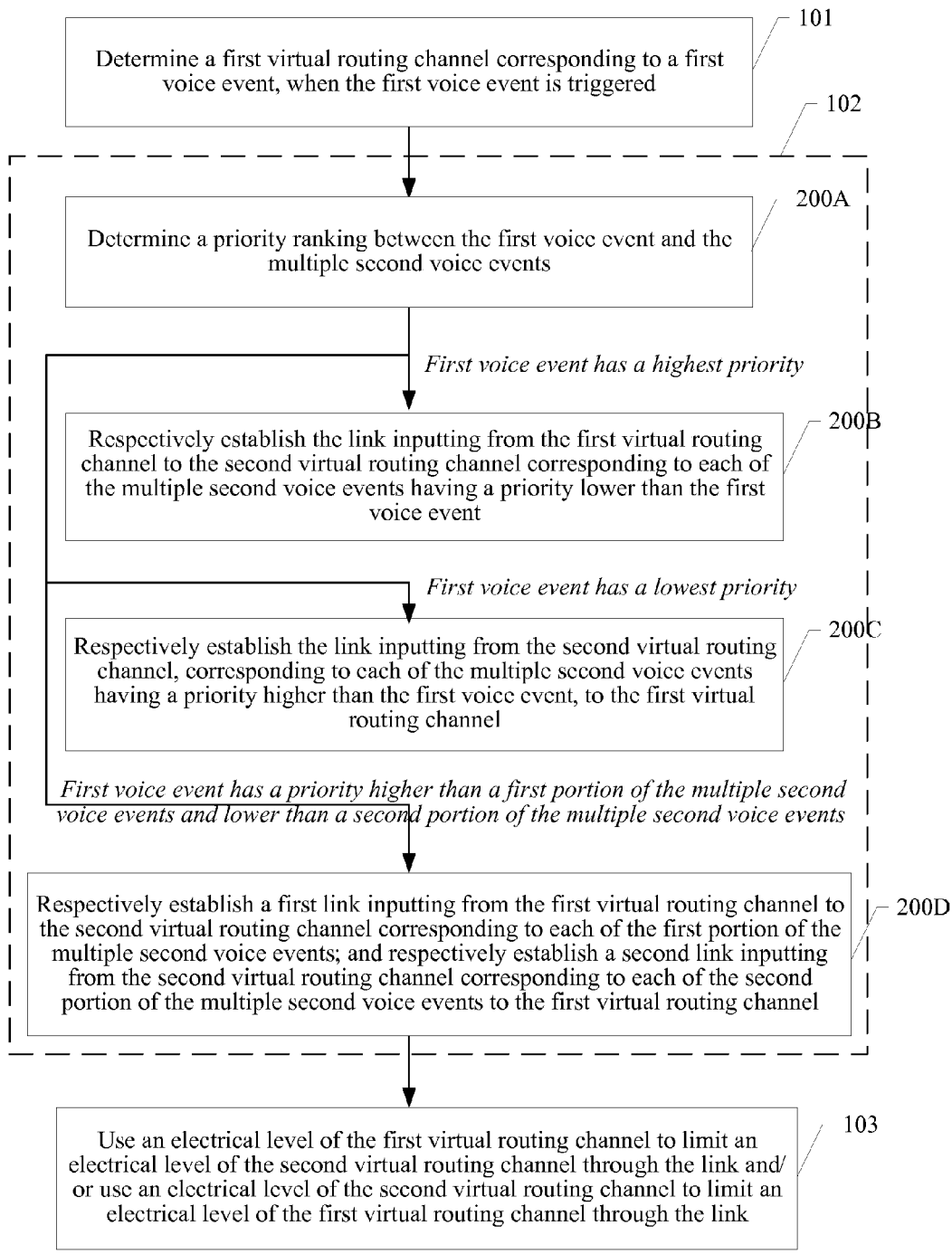
FIG. 2 depicts another exemplary method for implementing sound events consistent with various disclosed embodiments.

In an additional embodiment, referring to FIG. 2, when the second sound event includes multiple second sound events, Step S102 can be implemented by the implementing apparatus of sound event.

In 200A of FIG. 2, a priority ranking between the first sound event and the multiple second sound events is determined.

In 200B of FIG. 2, when the first sound event has a highest priority, the link for inputting from the first virtual routing channel to the second virtual routing channel corresponding to each of the multiple second sound events having a priority lower than the first sound event is respectively established. In this case, Step S103 can be implemented, through the link, by respectively using the electrical level of the first virtual routing channel to restrain the electrical level of the second virtual routing channel corresponding to each of the multiple second sound events. The restraining methods can be consistent by a same calculation method for the electrical level of the first virtual routing channel and for the electrical level of the second virtual routing channel corresponding to each of the multiple second sound events.

In 200C of FIG. 2, when the first sound event has a lowest priority, the link for inputting from the second virtual routing channel, corresponding to each of the multiple second sound events having a priority higher than the first sound event, to the first virtual routing channel is respectively established. In this case, Step S103 can be implemented, through the link, by respectively using the electrical level of the second virtual routing channel corresponding to each of the multiple second sound events to restrain the electrical level of the first virtual routing channel. The restraining methods can be inconsistent that the calculation method for the electrical level of the first virtual routing channel and the calculation method for the electrical level of the second virtual routing channel corresponding to each of the multiple second sound events may not be consistent.

In 200D of FIG. 2, when the first sound event has a priority higher than a first portion of the multiple second sound events and lower than a second portion of the multiple second sound events, a first link for inputting from the first virtual routing channel to the second virtual routing channel, corresponding to each of the first portion of the multiple second sound events having a priority lower than the first sound event is respectively established. A second link for inputting from the second virtual routing channel, corresponding to each of the second portion of the multiple second sound events having a priority higher than the first sound event, to the first virtual routing channel is respectively established.

In this case, Step S103 can be implemented by respectively using the electrical level of the first virtual routing channel to restrain the electrical level of the second virtual routing channel corresponding to each of the first portion of the multiple second sound events, through the first link; and by respectively using the electrical level of the second virtual routing channel corresponding to each of the second portion of the multiple second sound events to restrain the electrical level of the first virtual routing channel, through the second link.

Note that, via Steps 200A-200D, a nest relation can be formed among multiple virtual routing channels. That is, the electrical level of the virtual routing channel of sound event having the highest priority can be used to respectively restrain the electrical level of the virtual routing channel of sound event having a priority of other lower levels; the electrical level of the virtual routing channel(s) of sound event(s) having the secondarily higher priority can be used to respectively restrain the electrical level of the virtual routing channel(s) of sound event(s) having a priority lower than the sound event(s) of the secondarily higher priority, and so on.

Figure 3:
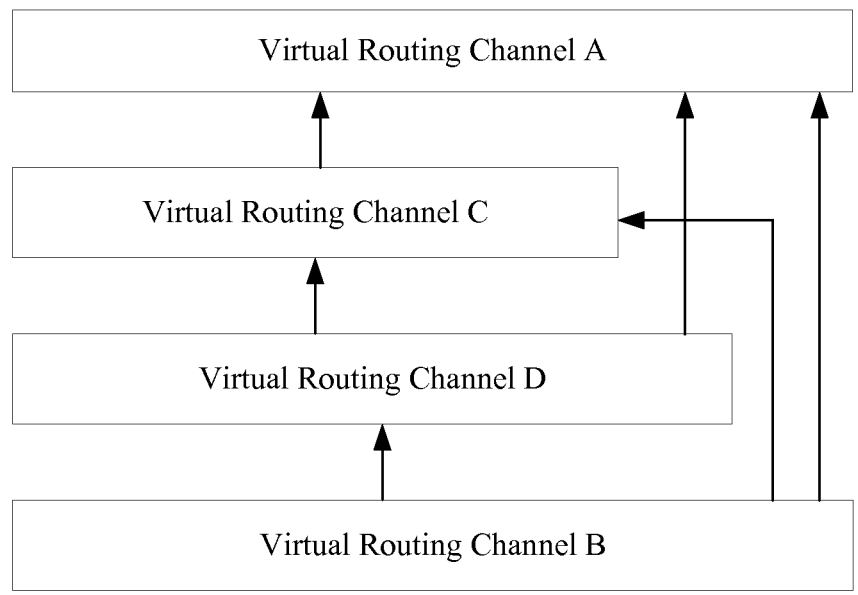
FIG. 3 depicts an exemplary relationship between virtual routing channels corresponding to multiple sound events consistent with various disclosed embodiments.

Referring to FIG. 3, in an example having four sound events A, B, C, and D with a priority from high to low for the sound events as B (highest)-D-C-A (lowest) corresponding to virtual routing channels b, d, c, and a, respectively, the electrical level of the virtual routing channel b is respectively inputted into the virtual routing channels d, c, and a; the electrical level of the virtual routing channel d is respectively inputted into the virtual routing channels c and a; and the electrical level of the virtual routing channel c is inputted into the virtual routing channel a. In this manner, the sound volume outputted by the virtual routing channel d to the user can be reflected after a calculation based on the electrical levels of the virtual routing channels b and d; while the sound volume outputted to the user by the virtual routing channel c can be reflected based on a calculation from the electrical levels of the virtual routing channels b, d and c; and the sound volume outputted to the user by the virtual routing channel a can be reflected based on a calculation from the electrical levels of the virtual routing channels b, d, c and a.

In another specific embodiment, when sound events are frequently triggered in an implementing process of multiple sound events, the sound volumes of the sound events may be flickering when outputted to the user during the ducking process. To avoid this flickering and to provide smooth sound output, the implementing apparatus of sound events can control the implementing of the sound events according to a degree of sound altering recognition by human ears.

Figure 4:
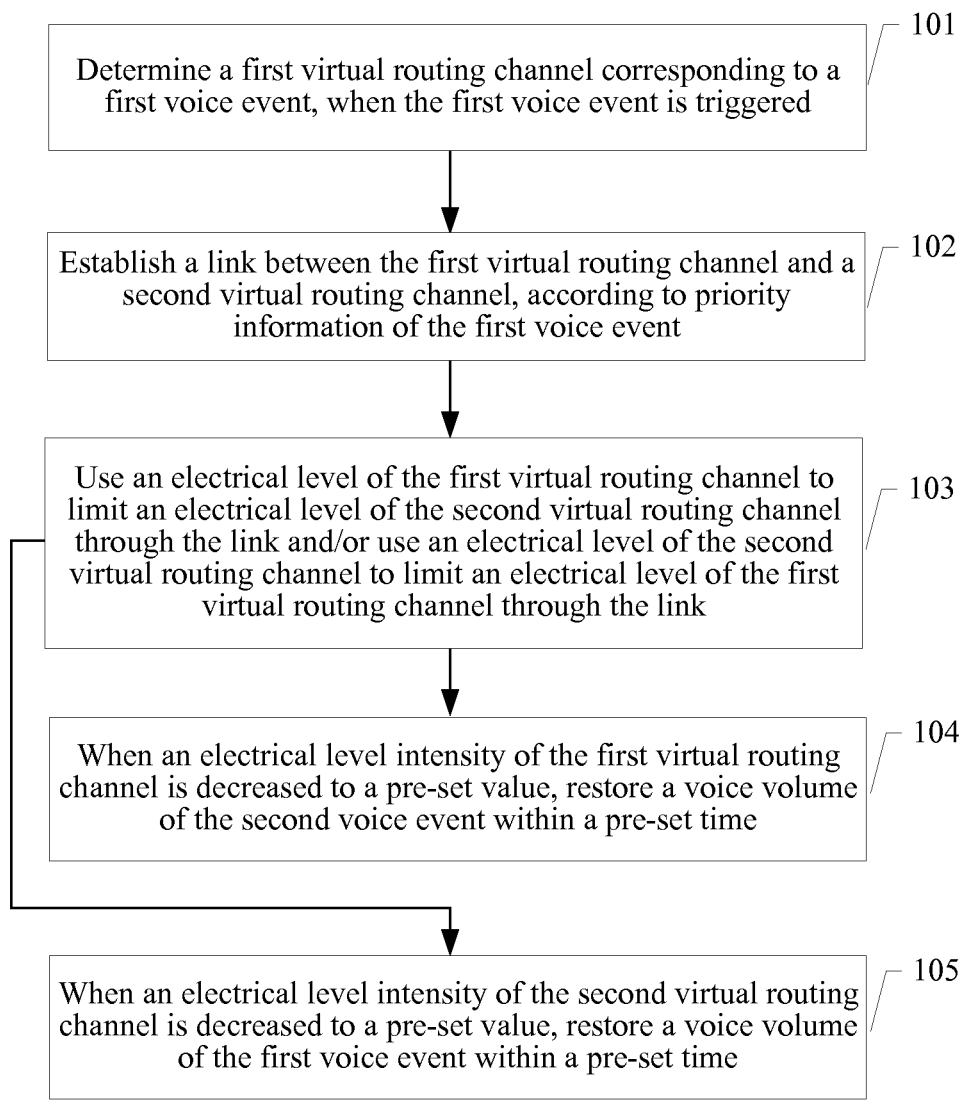
FIG. 4 depicts another exemplary method for implementing sound events consistent with various disclosed embodiments.

For example, as shown in FIG. 4, in the case when the implementing apparatus of sound events uses the electrical level of the first virtual routing channel to restrain the electrical level of the second virtual routing channel in Step S103, it is indicated that the volume of the second sound event is lower than the volume of the first sound event, and then Step S104 can be implemented. That is, when an electrical level intensity of the first virtual routing channel is decreased to a pre-set value, a sound volume of the second sound event can be restored within a pre-set time.

In the case when the implementing apparatus of sound events uses the electrical level of the second virtual routing channel to restrain the electrical level of the first virtual routing channel in Step S103, it is indicated that the volume of the first sound event is lower than the volume of the second sound event, and then Step S105 can be implemented. That is, when an electrical level intensity of the second virtual routing channel is decreased to a pre-set value, a sound volume of the first sound event can be restored within a pre-set time.

The above-mentioned pre-set time may be a time length that sound alteration cannot be recognized by human ears, for example, about 20 ms (milliseconds), such that the user may not be able to recognize the sound alteration during the ducking process of the sound event(s). In addition, the sound restoring of a sound event is that, when the virtual routing channel corresponding to the sound event outputs the electrical level of the virtual routing channel, the electrical level is not calculated with other electrical level(s) of virtual routing channel(s) for outputting but is directly outputted.

Figure 5:
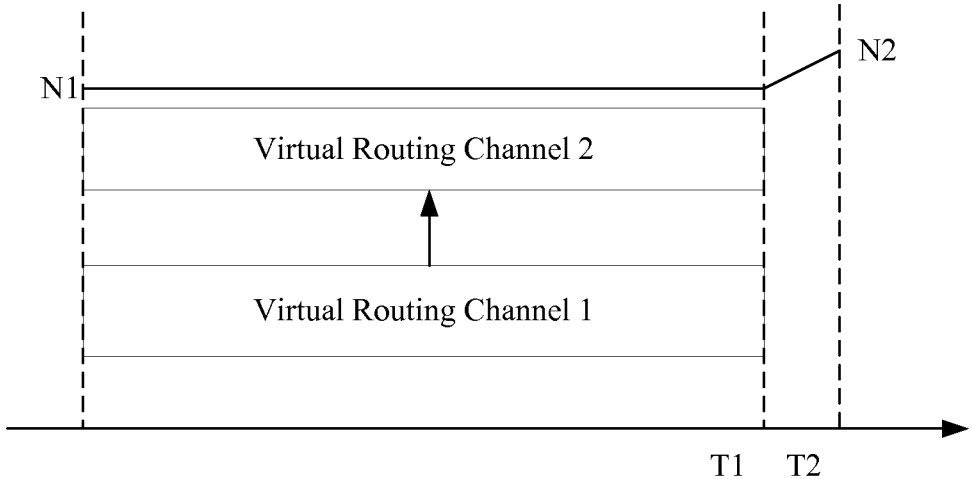
FIG. 5 is a structure diagram illustrating electrical level restraining between two virtual routing channels consistent with various disclosed embodiments.

Referring to FIG. 5, the electrical level of the virtual routing channel 1 restrains the electrical level of the virtual routing channel 2. The sound volume intensity outputted from the virtual routing channel 2 is marked as n1. At time T1, after the pre-set time of the electrical level of the virtual routing channel 2 is decreased to the pre-set value, at time T2, the virtual routing channel 2 directly outputs the channel electrical level, and the outputted sound volume intensity is marked as n2. The time difference ΔT between T2 and T1 is greater than or equal to the pre-set time.

Figure 6:
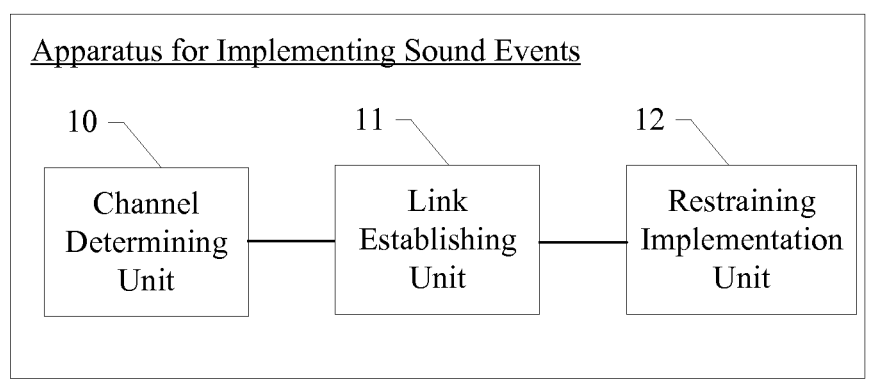
FIG. 6 depicts an exemplary apparatus for implementing sound events consistent with various disclosed embodiments.

FIG. 6 depicts an exemplary apparatus of implementing sound events consistent with various disclosed embodiments. The exemplary apparatus of FIG. 6 includes: a channel determining unit 10, a link establishing unit 11, and/or a restraining implementation unit 12.

The channel determining unit 10 is configured to determine a first virtual routing channel corresponding to a first sound event, when the first sound event is triggered.

The link establishing unit 11 is configured to establish a link between the first virtual routing channel determined by the channel determining unit 10 and a second virtual routing channel, according to priority information of the first sound event. The second virtual routing channel is a virtual routing channel corresponding to a currently-implemented second sound event; and The restraining implementation unit 12 is configured to use an electrical level of the first virtual routing channel to restrain an electrical level of the second virtual routing channel through the link established by the link establishing unit 11, and/or to use an electrical level of the second virtual routing channel to restrain an electrical level of the first virtual routing channel through the link established by the link establishing unit 11.

As such, in the disclosed apparatus, the link establishing unit 11 establishes the link between different virtual routing channels, and through this link, and the restraining implementation unit 12 uses an electrical level of one virtual routing channel to restrain another electrical level of the virtual routing channel. As the electrical level of a virtual routing channel may be used to indicate the volume of a corresponding sound event, the volume of one sound event can be restrained in real time by the volume of another sound event, such that the sound volumes of the two sound events can be different. The disclosed apparatus does not need to be used to process the ducking effect to one sound event by obtaining dynamic information of another sound event. By using the disclosed apparatus, control-accuracy of the ducking effect between multiple sound events can be improved.

Figure 7:
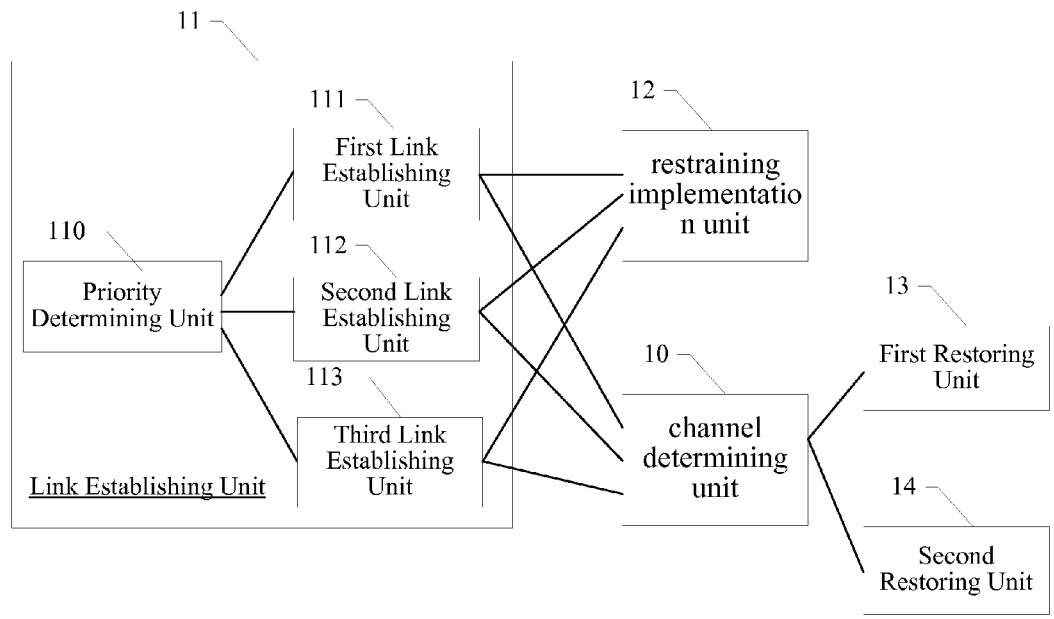
FIG. 7 depicts another exemplary apparatus for implementing sound events consistent with various disclosed embodiments.

Referring to FIG. 7, in one embodiment, an exemplary apparatus of implementing sound events further includes a first restoring unit 13 and a second restoring unit 14, based on the structure shown in FIG. 6. In addition, the link establishing unit 11 can include a priority determining unit 110, a first link establishing unit 111, a second link establishing unit 112, and/or a third link establishing unit 113.

The priority determining unit 110 is configured to determine a priority ranking between the first sound event and the multiple second sound events.

The first link establishing unit 111 is configured to respectively establish a link for inputting from the first virtual routing channel to the second virtual routing channel corresponding to each of the multiple second sound events having a priority lower than the first sound event, when the first sound event has a highest priority, according to the priority ranking determined by the priority determining unit 110.

The second link establishing unit 112 is configured to respectively establish the link for inputting from the second virtual routing channel, corresponding to each of the multiple second sound events having a priority higher than the first sound event, to the first virtual routing channel, when the first sound event has a lowest priority, according to the priority ranking determined by the priority determining unit 110.

The third link establishing unit 113 is configured: when the first sound event has a priority higher than a first portion of the multiple second sound events and lower than a second portion of the multiple second sound events, according to the priority ranking determined by the priority determining unit 110, to respectively establish a first link for inputting from the first virtual routing channel to the second virtual routing channel, corresponding to each of the first portion of the multiple second sound events having a priority lower than the first sound event; and to respectively establish a second link for inputting from the second virtual routing channel, corresponding to each of the second portion of the multiple second sound events having a priority higher than the first sound event, to the first virtual routing channel.

The first restoring unit 13 is configured to restore a sound volume of the second sound event within a pre-set time, when using the electrical level of the first virtual routing channel to restrain the electrical level of the second virtual routing channel by the channel determining unit 10 and when an electrical level intensity of the first virtual routing channel is decreased to a pre-set value.

The second restoring unit 14 is configured to restore a sound volume of the first sound event within a pre-set time, when using the electrical level of the second virtual routing channel to restrain the electrical level of the first virtual routing channel by the channel determining unit 10 and when an electrical level intensity of the second virtual routing channel is decreased to a pre-set value.

In one embodiment, the link establishing unit 11 establishes links between virtual routing channels by an establishing method as follows.

(1) When the second sound event includes one second sound event, and the first sound event has a priority higher than the one second sound event, the link establishing unit 11 establishes a link for inputting from the first virtual routing channel to the second virtual routing channel; the restraining implementation unit 12 uses the electrical level of the first virtual routing channel to restrain the electrical level of the second virtual routing channel through the link established by the link establishing unit 11.

(2) When the second sound event includes one second sound event, and the first sound event has a priority lower than the one second sound event, the link establishing unit 11 establishes the link for inputting from the second virtual routing channel to the first virtual routing channel; the restraining implementation unit 12 uses the electrical level of the second virtual routing channel to restrain the electrical level of the first virtual routing channel through the link established by the link establishing unit 11.

(3) When the second sound event includes multiple second sound events, first, second and third link establishing units can be used to establish a corresponding link, according to the priority ranking of the sound events determined by the priority determining unit 110.

For example, when the first link establishing unit 111 establishes a link, the restraining implementation unit 12 respectively uses the electrical level of the first virtual routing channel to restrain the electrical level of the second virtual routing channel corresponding to each of the multiple second sound events through the first link established by the link establishing unit 111.

When the second link establishing unit 112 establishes a link, the restraining implementation unit 12 respectively uses the electrical level of the second virtual routing channel corresponding to each of the multiple second sound events to restrain the electrical level of the first virtual routing channel through the link established by the second link establishing unit 112.

When the third link establishing unit 113 establishes a link, the restraining implementation unit 12 respectively uses the electrical level of the first virtual routing channel to restrain the electrical level of the second virtual routing channel corresponding to each of the first portion of the multiple second sound events through a first link established by the first link establishing unit 113; and respectively uses the electrical level of the second virtual routing channel corresponding to each of the second portion of the multiple second sound events to restrain the electrical level of the first virtual routing channel through a second link established by the first link establishing unit 113.

In one embodiment, to avoid flickering of sound volumes of sound events outputted to the user during the ducking process and to provide smooth sound output, the sound output of virtual routing channels corresponding to the sound events can be controlled by the first restoring unit 13 and the second restoring unit 14.

The disclosed methods for implementing sound events can be applied in a terminal device consistent with various embodiments. The exemplary apparatus for implementing sound events can be integrated in the terminal device. The terminal device can include, but is not limited to, smart phones, tablet computers, e-book readers, moving picture experts group audio layer III (MP3) players, moving picture experts group audio layer IV (MP4) players, laptops, and/or desktop computers.

Figure 8:
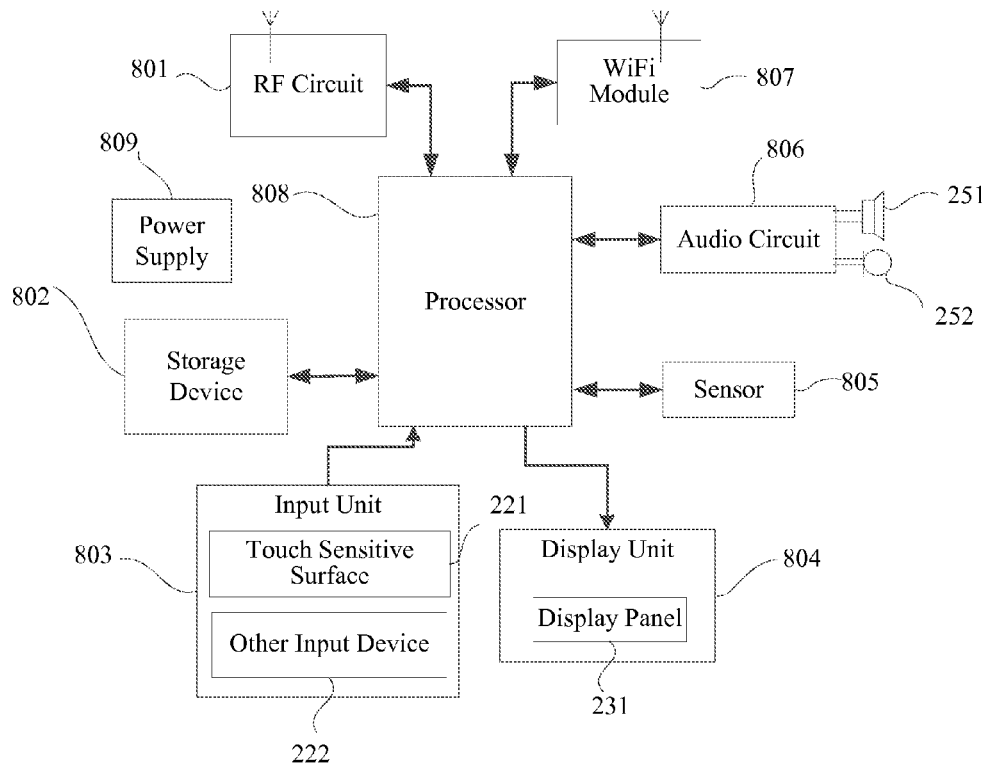
FIG. 8 depicts another exemplary apparatus for implementing sound events consistent with various disclosed embodiments.

FIG. 8 is a structural diagram of an exemplary terminal device 800 consistent with various disclosed embodiments. The disclosed apparatus can be included in the exemplary terminal device 800.

The exemplary terminal device 800 can include an RF (Radio Frequency) circuit 801, a storage device 802 including one or more computer-readable storage media, an input unit 803, a display unit 804, a sensor 805, an audio circuit 806, a WIFI (Wireless Fidelity) module 807, a processor 808 including one or more processing cores, a power supply 809, and/or other components. In various embodiments, the terminal device(s) described herein can include more or less components as depicted in FIG. 8. Certain components/parts can be omitted, combined, replaced, and/or added.

The RF circuit 801 can be used to send/receive information or send/receive signal during communication. In particular, after receiving downlink information from a base station, such information can be processed by the one or more processors 808. Further, the data related to the uplink can be sent to the base station. Generally, the RF circuit 801 can include, but be not limited to, an antenna, at least one amplifier, a tuner, one or more oscillators, a user identity module (SIM) card, a transceiver, a coupler, a LNA (i.e., Low Noise Amplifier), a duplexer, etc. In addition, the RF circuit 801 can communicate with other devices via a wireless communication network. The wireless communication can use any communication standards or protocols, including but not limited to, GSM (Global System for Mobile Communications), GPRS (General Packet Radio Service), CDMA (Code Division Multiple Access), WCDMA (Wideband Code Division Multiple Access), LTE (Long Term Evolution), e-mail, and SMS (Short Messaging Service).

The storage device 802 can be used for storing software programs and modules. By running software programs and modules stored in the storage device 802, the processor 808 can perform various functional applications and data processing as desired. The storage device 802 can include a program storage area and a data storage area. The program storage area can store the operating system, applications (such as sound playback, image playback, etc.) required by at least one function. The data storage area can store data (such as audio data, phone book, etc.) created when using the terminal device 800. In addition, the storage device 802 can include a high-speed random access memory and a non-volatile memory. For example, the storage device 802 can include at least one disk memory, flash memory, and/or other volatile solid-state memory elements. Accordingly, the storage device 802 can further include a memory controller to provide the processor 808 and the input unit 803 with access to the storage device 802.

The input unit 803 can be used to receive inputted numeric or character information, and to generate signal input of keyboard, mouse, joystick, and trackball or optical signal input related to the user settings and function controls. Specifically, the input unit 803 can include a touch sensitive surface 221 and other input device(s) 222. The touch-sensitive surface, also known as a touch screen or touch panel, can collect touch operations that a user conducts on or near the touch-sensitive surface. For example, a user can use a finger, a stylus, and any other suitable object or attachment on the touch-sensitive surface or on an area near the touch-sensitive surface. The touch-sensitive surface can drive a connecting device based on a preset program. Optionally, the touch sensitive surface 221 can include a touch detection device and a touch controller. The touch detection device can detect user's touch position and detect a signal due to a touch operation and then send the signal to the touch controller. The touch controller can receive touch information from the touch detection device, convert the touch information into contact coordinates to send to the processor 808, and receive commands sent from the processor 808 to execute. Furthermore, the touch sensitive surface 221 can be realized by resistive, capacitive, infrared surface acoustic wave, and/or other types of surface touch. In addition to the touch sensitive surface 221, the input unit 803 can also include other input device(s) 222. Specifically, the other input device(s) 222 can include, but be not limited to, a physical keyboard, function keys (such as volume control buttons, switch buttons, etc.), a trackball, a mouse, an operating lever, or combinations thereof.

The display unit 804 can be used to display information inputted by the user, information provided to the user, and a variety of graphical user interfaces of the terminal device 800. These graphical user interfaces can be formed by images, text, icons, videos, and/or any combinations thereof. The display unit 804 can include a display panel 231 configured by, e.g., LCD (Liquid Crystal Display), OLED (Organic Light-Emitting Diode), etc. Further, the touch sensitive surface 221 can cover the display panel 231. When the touch sensitive surface 221 detects a touch operation on or near the touch sensitive surface 221, the touch operation can be sent to the processor 808 to determine a type of the touch operation. Accordingly, the processor 808 can provide visual output on the display panel 231. Although in FIG. 8 the touch-sensitive surface and the display panel 231 are shown as two separate components to achieve input and output functions, in some embodiments, the touch sensitive surface 221 and the display panel 231 can be integrated to perform input and output functions.

The terminal device 800 can further include at least one sensor 805, such as optical sensors, motion sensors, and other suitable sensors. Specifically, the optical sensors can include an ambient optical sensor and a proximity sensor. The ambient optical sensor can adjust brightness of the display panel 231 according to the brightness of ambient light. The proximity sensor can turn off the display panel 231 and/or turn on backlighting, when the terminal device 800 moves to an ear. As a type of motion sensor, a gravity sensor can detect amount of an acceleration in each direction (e.g., including three axis) and detect magnitude and direction of gravity when in stationary. The gravity sensor can be used to identify phone posture (for example, switching between horizontal and vertical screens, related games, magnetometer calibration posture, etc.), and/or vibration recognition related functions (e.g., pedometer, percussion, etc.). The terminal device 800 can also be configured with, e.g., a gyroscope, a barometer, a hygrometer, a thermometer, an infrared sensor, and/or other sensors.

The audio circuit 806, the speaker 251, and the microphone 252 can provide an audio interface between the user and terminal device 800. The audio circuit 806 can transmit an electrical signal converted from the received audio data to the speaker to convert into audio signal output. On the other hand, the microphone can convert the collected sound signal to an electrical signal, which can be received by the audio circuit 806 to convert into audio data. The audio data can be output to the processor 808 for processing and then use the RF circuit 801 to transmit to, e.g., another terminal device. Alternatively, the audio data can be output to the storage device 802 for further processing. The audio circuit 806 can also include an earplug jack to provide communications between the peripheral headset and the terminal device 800.

WiFi is used as a short-range wireless transmission technology. The terminal device 800 can use the WIFI module 807 to help users send/receive emails, browse websites, access streaming media, etc. The WIFI module 807 can provide users with a wireless or wired broadband Internet access. In various embodiments, the transport module 807 can be configured within or outside of the terminal device 800 as depicted in FIG. 8.

The processor 808 can be a control center of the terminal device 800: using a variety of interfaces and circuits to connect various parts, e.g., within a mobile phone; running or executing software programs and/or modules stored in the storage device 802; calling the stored data in the storage device 802; and/or performing various functions and data processing of the terminal device 800, e.g., to monitor the overall mobile phone. Optionally, the processor 808 can include one or more processing cores. In an exemplary embodiment, the processor 808 can integrate application processor with modulation and demodulation processor. The application processor is mainly used to process operating system, user interface, and applications. The modulation and demodulation processor is mainly used to deal with wireless communications. In various embodiments, the modulation and demodulation processor may or may not be integrated into the processor 808.

The terminal device 800 can further include a power supply 809 (e.g., a battery) to power various components of the terminal device. In an exemplary embodiment, the power supply can be connected to the processor 808 via the power management system, and thus use the power management system to manage charging, discharging, and/or power management functions. The power supply 809 can also include one or more DC or AC power supplies, a recharging system, a power failure detection circuit, a power converter or inverter, a power status indicator, and/or any other suitable components.

Although not shown in FIG. 8, the terminal device 800 can further include a camera, a Bluetooth module, etc., without limitations.

The processor(s) 808 of the terminal device 800 can upload executable files corresponding to processes of one or more programs to the storage device 802. The processor(s) 808 can then be used to run these one or more programs stored in the storage device 802. For example, the processor(s) 808 can at least be configured to determine a first virtual routing channel corresponding to a first sound event, when the first sound event is triggered; establish a link between the first virtual routing channel and a second virtual routing channel, according to priority information of the first sound event, the second virtual routing channel being a virtual routing channel corresponding to a currently-implemented second sound event; and use an electrical level of the first virtual routing channel to restrain an electrical level of the second virtual routing channel through the link and/or use an electrical level of the second virtual routing channel to restrain an electrical level of the first virtual routing channel through the link.

In addition, the processor 808 establishes the link between the virtual routing channels by the following methods. For example, (1) when the second sound event includes one second sound event and the first sound event has a priority higher than the one second sound event, the processor 808 establishes the link for inputting from the first virtual routing channel to the second virtual routing channel; and the processor 808 uses the electrical level of the first virtual routing channel to restrain the electrical level of the second virtual routing channel through the established link.

(2) When the second sound event includes one second sound event and the first sound event has a priority lower than the second sound event, the processor 808 establishes the link for inputting from the second virtual routing channel to the first virtual routing channel; and the processor 808 uses the electrical level of the second virtual routing channel to restrain the electrical level of the first virtual routing channel through the link.

(3) When the second sound event includes multiple second sound events, the processor 808 firstly determines a priority ranking between the first sound event and the multiple second sound events, then establishes the corresponding link according to the priority ranking.

When the first sound event has a highest priority, the processor 808 respectively establishes the link for inputting from the first virtual routing channel to the second virtual routing channel corresponding to each of the multiple second sound events having a priority lower than the first sound event, and the processor 808 respectively uses the electrical level of the first virtual routing channel to restrain the electrical level of the second virtual routing channel corresponding to each of the multiple second sound events through the link.

When the first sound event has a lowest priority, the processor 808 respectively establishes the link for inputting from the second virtual routing channel, corresponding to each of the multiple second sound events having a priority higher than the first sound event, to the first virtual routing channel, and the processor 808 respectively uses the electrical level of the second virtual routing channel, corresponding to each of the multiple second sound events having the priority higher than the first sound event, to restrain the electrical level of the first virtual routing channel through the link.

When the first sound event has a priority higher than a first portion of the multiple second sound events and lower than a second portion of the multiple second sound events, the processor 808 respectively establishes a first link for inputting from the first virtual routing channel to the second virtual routing channel, corresponding to each of the first portion of the multiple second sound events having a priority lower than the first sound event and respectively establishes a second link for inputting from the second virtual routing channel, corresponding to each of the second portion of the multiple second sound events having a priority higher than the first sound event, to the first virtual routing channel. The processor 808, through the first link, respectively uses the electrical level of the first virtual routing channel to restrain the electrical level of the second virtual routing channel corresponding to each of the first portion of the multiple second sound events having the priority lower than the first sound event; and through the second link, respectively uses the electrical level of the second virtual routing channel corresponding to each of the second portion of the multiple second sound events having the priority higher than the first sound event to restrain the electrical level of the first virtual routing channel.

In addition, to avoid flickering of sound volumes of sound events outputted to the user during the ducking process and to provide smooth sound output, when the processor 808 uses the electrical level of the first virtual routing channel to restrain the electrical level of the second virtual routing channel and when an electrical level intensity of the first virtual routing channel is decreased to a pre-set value, the processor 808 restores a sound volume of the second sound event in a pre-set time. When the processor 808 uses the electrical level of the second virtual routing channel to restrain the electrical level of the first virtual routing channel and when an electrical level intensity of the second virtual routing channel is decreased to a pre-set value, the processor 808 restores a sound volume of the first sound event in a pre-set time.

In a conventional method, when a sound event having a higher priority is triggered, the program may reduce the volume of sound event having a lower priority. After a set and fixed time or after a playing of sound events having the higher priority is completed, the volume that has been previously reduced can be restored. However, when the sound event having a higher priority is triggered, the playing length and dynamic status of the sample cannot be determined and thus with undesired control-accuracy. For example, sounds from an explosion and a coin falling may correspond to sound events set to have a same priority. However, the sound from explosion has playing length and dynamic status of the sample that are greater than the coil falling sound. Conventional methods are not able to automatically change a degree for controlling.

In the disclosed method, electrical level of the sound in an actual playing in a routing channel can be identified to automatically control intensity of the ducking effect. In this manner, sound with higher priority can be heard clearly, while human ears cannot recognize such control. In one example of broadcasting, for ducking effect, a radio host can use a functional side-link to automatically lower the electrical level of the background music when the radio host is speaking. When the radio host is speaking, his speech can be inputted from the functional side-link to trigger the compressor to start to work to decrease the music sound to a pre-set electrical level. When the radio host stops speaking, the compressor stops and the electrical level of the music sound can be automatically restored to the original size.

In an example of game having a sound event A and a sound event B, a priority of sound events can be pre-set according to specific application when developing the game. When the sound event A is being played, a virtue routing channel can be used. When sound event A is being played, sound event B can be triggered. In a case when the sound event B has a priority higher than the sound event A, the program can generate another virtue routing channel for the sound event B and can establish a side-link to connect the two virtue routing channels. The electrical level of the virtual routing channel according to the sound event A can be restrained according to an electrical level intensity reduction of the virtual routing channel corresponding to the sound event B. when the electrical level intensity of the virtual routing channel corresponding to the sound event B is decreased to a pre-set value, a sound volume of the sound event A can be automatically restored within a pre-set restoring time. When playing of the sound event is completed and recovered, the generated virtual routing channel can be removed by the program implemented by a computer system (e.g., including a terminal device as shown in FIG. 8).

In this manner, according to the priority of sound events in a game, by recognizing the electrical level of sound that is actually being played in a routing channel, a link (e.g., a side-link or a nest link) can be generated to allow the sound having highest priority to be clearly heard without recognize control of the sound events.

It should be understood that steps described in various methods of the present disclosure may be carried out in order as shown, or alternately, in a different order. Therefore, the order of the steps illustrated should not be construed as limiting the scope of the present disclosure. In addition, certain steps may be performed simultaneously.

In the present disclosure each embodiment is progressively described, i.e., each embodiment is described and focused on difference between embodiments. Similar and/or the same portions between various embodiments can be referred to with each other. In addition, exemplary apparatus and/or systems are described with respect to corresponding methods.

The disclosed methods, apparatus, and/or systems can be implemented in a suitable computing environment. The disclosure can be described with reference to symbol(s) and step(s) performed by one or more computers, unless otherwise specified. Therefore, steps and/or implementations described herein can be described for one or more times and executed by computer(s). As used herein, the term "executed by computer(s)" includes an execution of a computer processing unit on electronic signals of data in a structured type. Such execution can convert data or maintain the data in a position in a memory system (or storage device) of the computer, which can be reconfigured to alter the execution of the computer as appreciated by those skilled in the art. The data structure maintained by the data includes a physical location in the memory, which has specific properties defined by the data format. However, the embodiments described herein are not limited. The steps and implementations described herein may be performed by hardware.

As used herein, the term "module" or "unit" can be software objects executed on a computing system. A variety of components described herein including elements, modules, units, engines, and services can be executed in the computing system. The methods, apparatus, and/or systems can be implemented in a software manner. Of course, the methods, apparatus, and/or systems can be implemented using hardware. All of which are within the scope of the present disclosure.

A person of ordinary skill in the art can understand that the units/modules included herein are described according to their functional logic, but are not limited to the above descriptions as long as the units/modules can implement corresponding functions. Further, the specific name of each functional module is used to be distinguished from one another without limiting the protection scope of the present disclosure.

In various embodiments, the disclosed units/modules can be configured in one apparatus (e.g., a processing unit) or configured in multiple apparatus as desired. The units/modules disclosed herein can be integrated in one unit/module or in multiple units/modules. Each of the units/modules disclosed herein can be divided into one or more sub-units/modules, which can be recombined in any manner. In addition, the units/modules can be directly or indirectly coupled or otherwise communicated with each other, e.g., by suitable interfaces.

One of ordinary skill in the art would appreciate that suitable software and/or hardware (e.g., a universal hardware platform) may be included and used in the disclosed methods, apparatus, and/or systems. For example, the disclosed embodiments can be implemented by hardware only, which alternatively can be implemented by software products only. The software products can be stored in computer-readable storage medium including, e.g., ROM/RAM, magnetic disk, optical disk, etc. The software products can include suitable commands to enable a terminal device (e.g., including a mobile phone, a personal computer, a server, or a network device, etc.) to implement the disclosed embodiments.

Note that, the term "comprising", "including" or any other variants thereof are intended to cover a non-exclusive inclusion, such that the process, method, article, or apparatus containing a number of elements also include not only those elements, but also other elements that are not expressly listed; or further include inherent elements of the process, method, article or apparatus. Without further restrictions, the statement "includes a" does not exclude other elements included in the process, method, article, or apparatus having those elements.

The embodiments disclosed herein are exemplary only. Other applications, advantages, alternations, modifications, or equivalents to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

Methods and apparatus for implementing sound events are provided. When a first sound event is triggered, a first virtual routing channel corresponding to the first sound event is determined. A link between the first virtual routing channel and a second virtual routing channel is established according to priority information of the first sound event. The second virtual routing channel is a virtual routing channel corresponding to a currently-implemented second sound event. One or more processes are performed including: using an electrical level of the first virtual routing channel to restrain an electrical level of the second virtual routing channel through the link, and using an electrical level of the second virtual routing channel to restrain an electrical level of the first virtual routing channel through the link. Accordingly, the apparatus includes a channel determining unit, a link establishing unit, and a restraining implementation unit.

As such, the implementing apparatus of sound events establishes the link between different virtual routing channels, and through this link, uses an electrical level of the virtual routing channel to restrain another electrical level of the virtual routing channel. As the electrical level of a virtual routing channel may indicate the sound volume of a corresponding sound event, the sound volume of one sound event can be restrained (or reduced) in real time by the sound volume of another sound event, such that the sound volumes of the two sound events can be different. The disclosed method does not need to process the ducking effect to one sound event by obtaining dynamic information of another sound event. The disclosed method can improve control-accuracy of the ducking effect between multiple sound events. For example, electrical level of the sound in an actual playing in a routing channel can be identified to automatically control intensity of the ducking effect. In this manner, sound event with higher priority can be heard clearly, while human ears cannot recognize such control.

What is claimed is:

1. A method for implementing sound events, comprising:
   determining a first virtual routing channel corresponding to a first sound event, when the first sound event is triggered;
   establishing a link between the first virtual routing channel and a second virtual routing channel according to priority information of the first sound event, wherein the second virtual routing channel is a virtual routing channel corresponding to a currently-implemented second sound event; and
   performing one or more processes including: using an electrical level of the first virtual routing channel to restrain an electrical level of the second virtual routing channel through the link, and using an electrical level of the second virtual routing channel to restrain an electrical level of the first virtual routing channel through the link.

2. The method according to claim 1, wherein, when the second sound event includes one second sound event, the step of establishing the link between the first virtual routing channel and the second virtual routing channel according to the priority information of the first sound event includes:
   when the first sound event has a priority higher than the one second sound event, establishing the link for inputting from the first virtual routing channel to the second virtual routing channel; and
   through the link, using the electrical level of the first virtual routing channel to restrain the electrical level of the second virtual routing channel.

3. The method according to claim 1, wherein, when the second sound event includes one second sound event, the step of establishing the link between the first virtual routing channel and the second virtual routing channel according to the priority information of the first sound event includes:
   when the first sound event has a priority lower than the second sound event, establishing the link for inputting from the second virtual routing channel to the first virtual routing channel; and
   through the link, using the electrical level of the second virtual routing channel to restrain the electrical level of the first virtual routing channel.

4. The method according to claim 1, wherein, when the second sound event includes a plurality of second sound events, the step of establishing the link between the first virtual routing channel and the second virtual routing channel according to the priority information of the first sound event includes:
   determining a priority ranking between the first sound event and the plurality of second sound events;
   when the first sound event has a highest priority, respectively establishing the link for inputting from the first virtual routing channel to the second virtual routing channel corresponding to each of the plurality of second sound events having a priority lower than the first sound event; and
   through the link, respectively using the electrical level of the first virtual routing channel to restrain the electrical level of the second virtual routing channel corresponding to each of the plurality of second sound events.

5. The method according to claim 4, wherein the step of establishing the link between the first virtual routing channel and the second virtual routing channel according to the priority information of the first sound event further includes:
   when the first sound event has a lowest priority, respectively establishing the link for inputting from the second virtual routing channel, corresponding to each of the plurality of second sound events having a priority higher than the first sound event, to the first virtual routing channel; and
   through the link, respectively using the electrical level of the second virtual routing channel, corresponding to each of the plurality of second sound events having the priority higher than the first sound event, to restrain the electrical level of the first virtual routing channel.

6. The method according to claim 4, wherein the step of establishing the link between the first virtual routing channel and the second virtual routing channel according to the priority information of the first sound event further includes:
when the first sound event has a priority higher than a first portion of the plurality of second sound events and lower than a second portion of the plurality of second sound events,
respectively establishing a first link for inputting from the first virtual routing channel to the second virtual routing channel, corresponding to each of the first portion of the plurality of second sound events having a priority lower than the first sound event;
respectively establishing a second link for inputting from the second virtual routing channel, corresponding to each of the second portion of the plurality of second sound events having a priority higher than the first sound event, to the first virtual routing channel;
through the first link, respectively using the electrical level of the first virtual routing channel to restrain the electrical level of the second virtual routing channel corresponding to each of the first portion of the plurality of second sound events having the priority lower than the first sound event; and
through the second link, respectively using the electrical level of the second virtual routing channel corresponding to each of the second portion of the plurality of second sound events having the priority higher than the first sound event to restrain the electrical level of the first virtual routing channel.

7. The method according to claim 1, further including:
when using the electrical level of the first virtual routing channel to restrain the electrical level of the second virtual routing channel and when an electrical level intensity of the first virtual routing channel is decreased to a pre-set value, restoring a sound volume of the second sound event within a pre-set time; and
when using the electrical level of the second virtual routing channel to restrain the electrical level of the first virtual routing channel and when an electrical level intensity of the second virtual routing channel is decreased to a pre-set value, restoring a sound volume of the first sound event within a pre-set time.

8. An apparatus for implementing sound events, comprising:
a channel determining unit, configured to determine a first virtual routing channel corresponding to a first sound event, when the first sound event is triggered;
a link establishing unit, configured to establish a link between the first virtual routing channel determined by the channel determining unit and a second virtual routing channel, according to priority information of the first sound event, wherein the second virtual routing channel is a virtual routing channel corresponding to a currently-implemented second sound event; and
a restraining implementation unit, configured to perform one or more processes including: using an electrical level of the first virtual routing channel to restrain an electrical level of the second virtual routing channel through the link, and using an electrical level of the second virtual routing channel to restrain an electrical level of the first virtual routing channel through the link.

9. The apparatus according to claim 8, wherein, when the second sound event includes one second sound event, the link establishing unit is configured to establish the link for inputting from the first virtual routing channel to the second virtual routing channel, when the first sound event has a priority higher than the one second sound event; and
the restraining implementation unit is configured to use the electrical level of the first virtual routing channel to restrain the electrical level of the second virtual routing channel, through the link established by the link establishing unit.

10. The apparatus according to claim 8, wherein, when the second sound event includes one second sound event, the link establishing unit is configured to establish the link for inputting from the second virtual routing channel to the first virtual routing channel, when the first sound event has a priority lower than the second sound event; and
the restraining implementation unit is configured to use the electrical level of the second virtual routing channel to restrain the electrical level of the first virtual routing channel through the link established by the link establishing unit.

11. The apparatus according to claim 8, wherein, when the second sound event includes a plurality of second sound events, the link establishing unit includes:
a priority determining unit, configured to determine a priority ranking between the first sound event and the plurality of second sound events; and
a first link establishing unit, configured to respectively establish the link for inputting from the first virtual routing channel to the second virtual routing channel corresponding to each of the plurality of second sound events having a priority lower than the first sound event, when the first sound event has a highest priority; and
wherein the restraining implementation unit is configured to respectively use the electrical level of the first virtual routing channel to restrain the electrical level of the second virtual routing channel corresponding to each of the plurality of second sound events, through the link established by the first link establishing unit.

12. The apparatus according to claim 11, wherein the link establishing unit further includes:
a second link establishing unit, configured to respectively establish the link for inputting from the second virtual routing channel, corresponding to each of the plurality of second sound events having a priority higher than the first sound event, to the first virtual routing channel, when the first sound event has a lowest priority; and
wherein the restraining implementation unit is configured to respectively use the electrical level of the second virtual routing channel, corresponding to each of the plurality of second sound events having the priority higher than the first sound event, to restrain the electrical level of the first virtual routing channel, through the link established by the second link establishing unit.

13. The apparatus according to claim 11, wherein the link establishing unit further includes:
a third link establishing unit configured:
when the first sound event has a priority higher than a first portion of the plurality of second sound events and lower than a second portion of the plurality of second sound events,
to respectively establish a first link for inputting from the first virtual routing channel to the second virtual routing channel, corresponding to each of the first portion of the plurality of second sound events having a priority lower than the first sound event;

to respectively establish a second link for inputting from the second virtual routing channel, corresponding to each of the second portion of the plurality of second sound events having a priority higher than the first sound event, to the first virtual routing channel; and wherein the restraining implementation unit is configured:

to respectively use the electrical level of the first virtual routing channel to restrain the electrical level of the second virtual routing channel corresponding to each of the first portion of the plurality of second sound events having the priority lower than the first sound event, through the first link established by the third link establishing unit; and to respectively use the electrical level of the second virtual routing channel corresponding to each of the second portion of the plurality of second sound events having the priority higher than the first sound event to restrain the electrical level of the first virtual routing channel, through the second link established by the third link establishing unit.

14. The apparatus according to claim 8, further including:

a first restoring unit, configured to restore a sound volume of the second sound event within a pre-set time, when using the electrical level of the first virtual routing channel to restrain the electrical level of the second virtual routing channel and when an electrical level intensity of the first virtual routing channel is decreased to a pre-set value; and a second restoring unit, configured to restore a sound volume of the first sound event within a pre-set time, when using the electrical level of the second virtual routing channel to restrain the electrical level of the first virtual routing channel and when an electrical level intensity of the second virtual routing channel is decreased to a pre-set value.

15. A non-transitory computer-readable medium having computer program for, when being executed by a processor, performing a method for implementing sound events, the method comprising:

determining a first virtual routing channel corresponding to a first sound event, when the first sound event is triggered;

establishing a link between the first virtual routing channel and a second virtual routing channel according to priority information of the first sound event, wherein the second virtual routing channel is a virtual routing channel corresponding to a currently-implemented second sound event; and performing one or more processes including: using an electrical level of the first virtual routing channel to restrain an electrical level of the second virtual routing channel through the link, and using an electrical level of the second virtual routing channel to restrain an electrical level of the first virtual routing channel through the link.

16. The non-transitory computer-readable medium according to claim 15, wherein, when the second sound event includes one second sound event, the step of establishing the link between the first virtual routing channel and the second virtual routing channel according to the priority information of the first sound event includes:

when the first sound event has a priority higher than the one second sound event, establishing the link for inputting from the first virtual routing channel to the second virtual routing channel; and through the link, using the electrical level of the first virtual routing channel to restrain the electrical level of the second virtual routing channel.

17. The non-transitory computer-readable medium according to claim 15, wherein, when the second sound event includes one second sound event, the step of establishing the link between the first virtual routing channel and the second virtual routing channel according to the priority information of the first sound event includes:

when the first sound event has a priority lower than the second sound event, establishing the link for inputting from the second virtual routing channel to the first virtual routing channel; and through the link, using the electrical level of the second virtual routing channel to restrain the electrical level of the first virtual routing channel.

18. The non-transitory computer-readable medium according to claim 15, wherein, when the second sound event includes a plurality of second sound events, the step of establishing the link between the first virtual routing channel and the second virtual routing channel according to the priority information of the first sound event includes:

determining a priority ranking between the first sound event and the plurality of second sound events;

when the first sound event has a highest priority, respectively establishing the link for inputting from the first virtual routing channel to the second virtual routing channel corresponding to each of the plurality of second sound events having a priority lower than the first sound event; and through the link, respectively using the electrical level of the first virtual routing channel to restrain the electrical level of the second virtual routing channel corresponding to each of the plurality of second sound events.

19. The non-transitory computer-readable medium according to claim 18, wherein the step of establishing the link between the first virtual routing channel and the second virtual routing channel according to the priority information of the first sound event further includes:

when the first sound event has a lowest priority, respectively establishing the link for inputting from the second virtual routing channel, corresponding to each of the plurality of second sound events having a priority higher than the first sound event, to the first virtual routing channel; and through the link, respectively using the electrical level of the second virtual routing channel, corresponding to each of the plurality of second sound events having the priority higher than the first sound event, to restrain the electrical level of the first virtual routing channel.

20. The non-transitory computer-readable medium according to claim 18, wherein the step of establishing the link between the first virtual routing channel and the second virtual routing channel according to the priority information of the first sound event further includes:

when the first sound event has a priority higher than a first portion of the plurality of second sound events and lower than a second portion of the plurality of second sound events, respectively establishing a first link for inputting from the first virtual routing channel to the second virtual routing channel, corresponding to each of the first portion of the plurality of second sound events having a priority lower than the first sound event;

respectively establishing a second link for inputting from the second virtual routing channel, corresponding to each of the second portion of the plurality of second sound events having a priority higher than the first sound event, to the first virtual routing channel;

through the first link, respectively using the electrical level of the first virtual routing channel to restrain the electrical level of the second virtual routing channel corresponding to each of the first portion of the plurality of second sound events having the priority lower than the first sound event; and through the second link, respectively using the electrical level of the second virtual routing channel corresponding to each of the second portion of the plurality of second sound events having the priority higher than the first sound event to restrain the electrical level of the first virtual routing channel.

* * * * *